United States Patent [19]

Tanaka et al.

[11] Patent Number: 4,523,195
[45] Date of Patent: Jun. 11, 1985

[54] ROTATIONAL DIRECTION AND ANGLE DETECTING APPARATUS

[75] Inventors: Hiroaki Tanaka; Shigeyuki Akita, both of Okazaki, Japan

[73] Assignee: Nippon Soken, Inc., Nishio, Japan

[21] Appl. No.: 354,433

[22] Filed: Mar. 3, 1982

[30] Foreign Application Priority Data

Mar. 9, 1981 [JP] Japan ................................ 56-33585

[51] Int. Cl.$^3$ ............................................ G08C 19/10
[52] U.S. Cl. ............................................... 340/870.37
[58] Field of Search ............ 340/671, 672, 686, 870.37; 377/17; 324/176; 318/662

[56] References Cited

U.S. PATENT DOCUMENTS

| | | | |
|---|---|---|---|
| 2,674,729 | 4/1954 | Carter | 340/870.37 |
| 3,760,392 | 9/1973 | Stich | 340/870.37 |
| 3,873,916 | 3/1975 | Sterki | 340/870.37 |
| 3,938,113 | 2/1976 | Dobson et al. | 340/870.37 |
| 3,961,318 | 6/1976 | Farrand et al. | 340/870.37 |
| 4,007,357 | 2/1977 | Yanagishima | 340/672 |
| 4,092,579 | 5/1978 | Weit | 340/870.37 |
| 4,199,800 | 4/1980 | Weit | 340/870.37 |
| 4,350,981 | 9/1982 | Tanaka et al. | 340/870.37 |
| 4,418,347 | 11/1983 | Tanaka et al. | 340/870.37 |
| 4,418,348 | 11/1983 | Tanaka et al. | 340/870.37 |
| 4,423,417 | 12/1983 | Tanaka et al. | 340/870.37 |

FOREIGN PATENT DOCUMENTS 87955 7/1980 Japan ................................ 340/686

Primary Examiner—James J. Gill
Attorney, Agent, or Firm—Cushman, Darby & Cushman

[57] ABSTRACT

A rotational direction and angle detecting apparatus includes a stationary plate having first and second electrodes and a rotatable plate having third and fourth electrodes. Rectangular wave signals of opposite phases are applied to the first and second electrodes of the stationary plate. The third electrode of the rotatable plate has first and second auxiliary electrodes and the fourth electrode has third and fourth auxiliary electrodes. The first and second auxiliary electrodes and the third and fourth auxiliary electrodes are in opposed relation to the first and second electrodes respectively. With rotation of the rotatable plate, the capacitance values formed between the first and second auxiliary electrode and the first electrode and between the third and fourth auxiliary electrode and the second electrode are changed respectively. In accordance with the change of the capacitance, first and second rotation signal generator circuits produce first and second rotation signals respectively, which are logically computed by a logic operational circuit. A rotational angle is digitally displayed by a digital display unit according to the result of the logic computation.

9 Claims, 13 Drawing Figures

ROTATIONAL DIRECTION AND ANGLE DETECTING APPARATUS

BACKGROUND OF THE INVENTION

The present invention relates to a rotation detecting apparatus for detecting the direction and the angle of the rotation of a rotary object at the same time, which is useful as a handle steering angle sensor or a throttle valve position sensor of an automobile.

SUMMARY OF THE INVENTION

According to the present invention, there is provided a rotation detecting apparatus for detecting the rotational direction and angle of a shaft in a satisfactory manner, comprising a fixed first plate and a second plate arranged in opposed relation to the first plate and rotated by the rotation of the shaft. The first plate includes first and second input electrodes arranged alternately at regular spatial intervals. The second plate includes a plurality of third output electrodes arranged at regular spatial intervals in opposed relation to the electrodes of the first plate, and a plurality of fourth output electrodes arranged to oppose the first and second input electrodes when the third output electrodes are not in opposed relation to the first and second input electrodes. As the second plate rotates, the first input electrode of the first plate is opposed to the third output electrode of the second plate or the second input electrode of the first plate is opposed to the third output electrode of the second plate, so that these two conditions are detected by the third output electrode of the second plate from pulse voltages (or AC voltages) or opposite phase applied to the first and second input electrodes of the first plate thereby to produce a first rotation signal for detecting the rotation of the second plate; or the first input electrode of the first plate is opposed to the fourth output electrode of the second plate or the second input electrode of the first plate is opposed to the fourth output electrode of the second plate, so that these two conditions are detected by the fourth output electrode of the second plate from the voltage applied to the input electrodes of the first plate thereby to produce a second rotation signal for detecting the rotation of the second plate.

DESCRIPTION OF THE PREFERRED EMBODIMENTS

The present invention will be explained below with reference to the embodiments shown in the accompanying drawings.

Figure 1A:
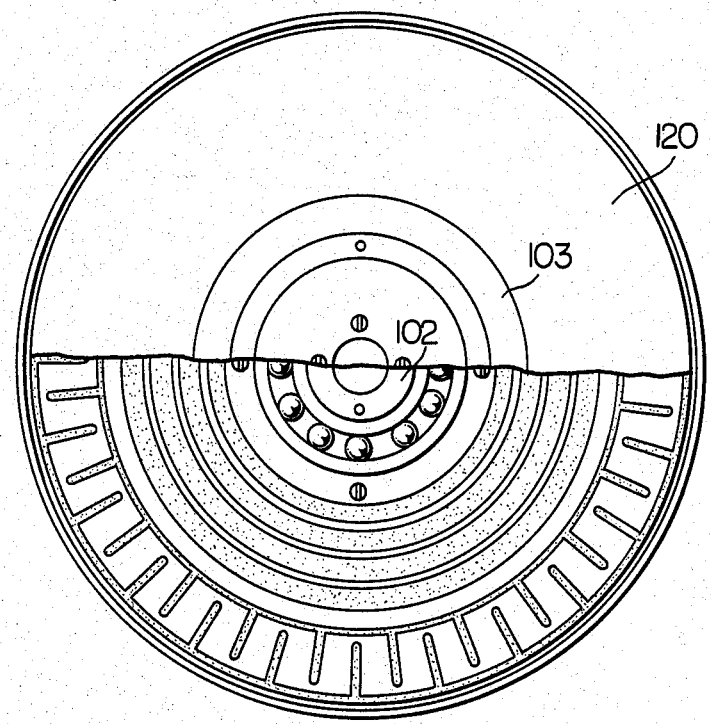
FIGS. 1A and 1B are sectional views showing an embodiment of an apparatus of the present invention.
Figure 1B:
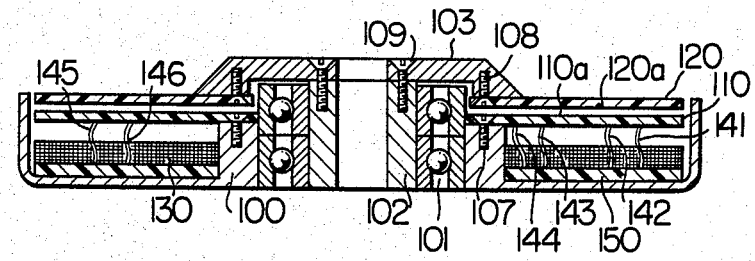

An embodiment is shown in FIGS. 1 to 7. In FIG. 1, reference numeral 100 designates a housing secured to the outside of a bearing 101, numeral 102 a shaft second to the inside of the bearing 101, and numeral 103 a rotor coupled to an object of measurement, the shaft 102 being rotated by the rotation of the rotor 103. A second plate 102 of a printed board having a side 120a printed with electrodes is fixed to the rotor 103 with screws 108 and rotates with the rotation of the rotor 103. A first plate 110 of a printed board having a side 110a with electrodes is secured to the housing 100 with screws 107 and is connected with signal lines 141, 142, 143, 144, 145 and 146 from a detecting circuit 130 on a printed board 150 fixed on the housing 100.

Figure 2A:
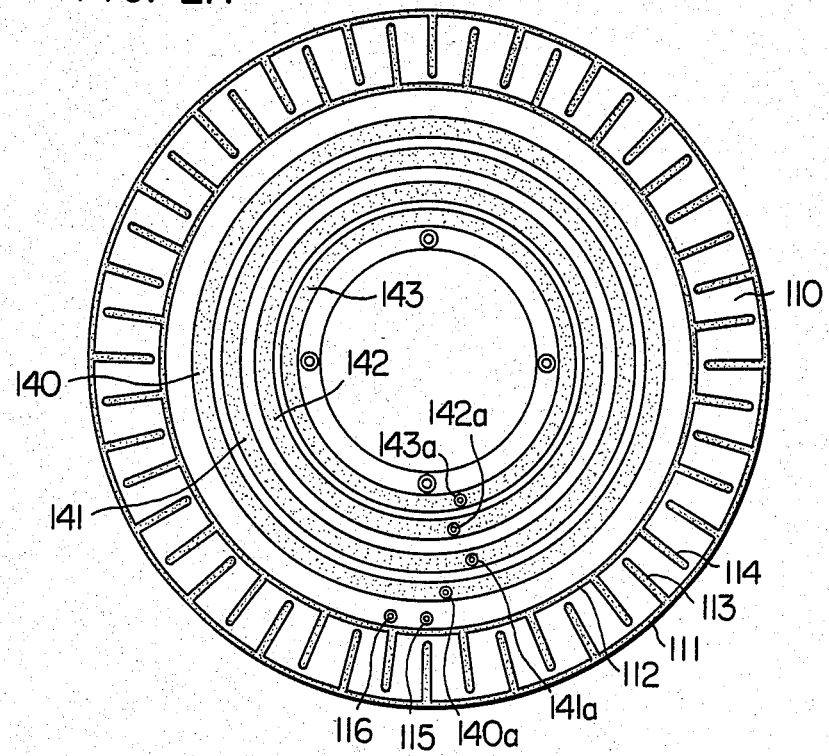
FIGS. 2A and 2B are a front view of the first plate and a front view of the side of the second plate which is opposed to the first plate of the apparatus according to the present invention respectively.

A first view of the side 110a of the first plate 110 is shown in FIG. 2A. Numerals 113 and 114 designate first and second input electrodes respectively connected to connecting lines 111 and 112, and arranged alternately at equal intervals circumferentially.

The first and second input electrodes are connected to the detecting circuit 130 at connectors 115 and 116 respectively.

The signal lines 140, 141, 142 and 143 are first, second, third and fourth annular electrodes respectively, and are connected to the detecting circuit 130 at connectors 140a, 141a, 142a and 143a respectively.

Figure 2B:
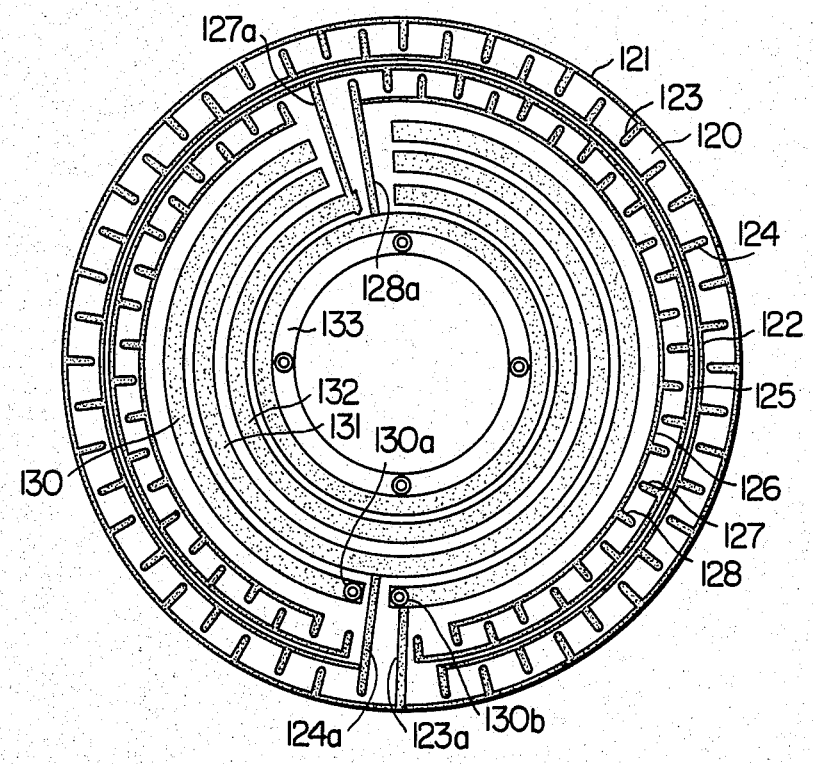

A front view of the side 120a of the second plate 120 is shown in FIG. 2B. Numerals 123 and 124 designate first and second electrode units or subelectrodes of the third output electrode respectively opposed to the first electrode 113 and the second electrode 114 of the first plate 110 and connected to the connecting lines 121 and 122. Numerals 127 and 128 designate third and fourth electrode units of the second plate 120 connected by the connecting lines 125 and 126 respectively and positioned to oppose to the first and second input electrodes respectively when the first and second electrode units 123 and 124 of the third output electrode are not opposed to the first and second input electrodes 113 and 114 respectively.

Numerals 130, 131, 132 and 133 designate first, second, third and fourth annular electrodes arranged in opposed relation to the annular electrodes 140, 141, 142 and 143 of the first plate 110, and connected to the first, second, third and fourth electrodes 123, 124, 127 and 128 by way of the connecting lines 123a, 124a, 127a and 128a.

The first annular electrode 130 is connected on the back of the second plate 120 by through holes 130a and 130b provided to connect the front and back of the second plate 120.

Figure 3:
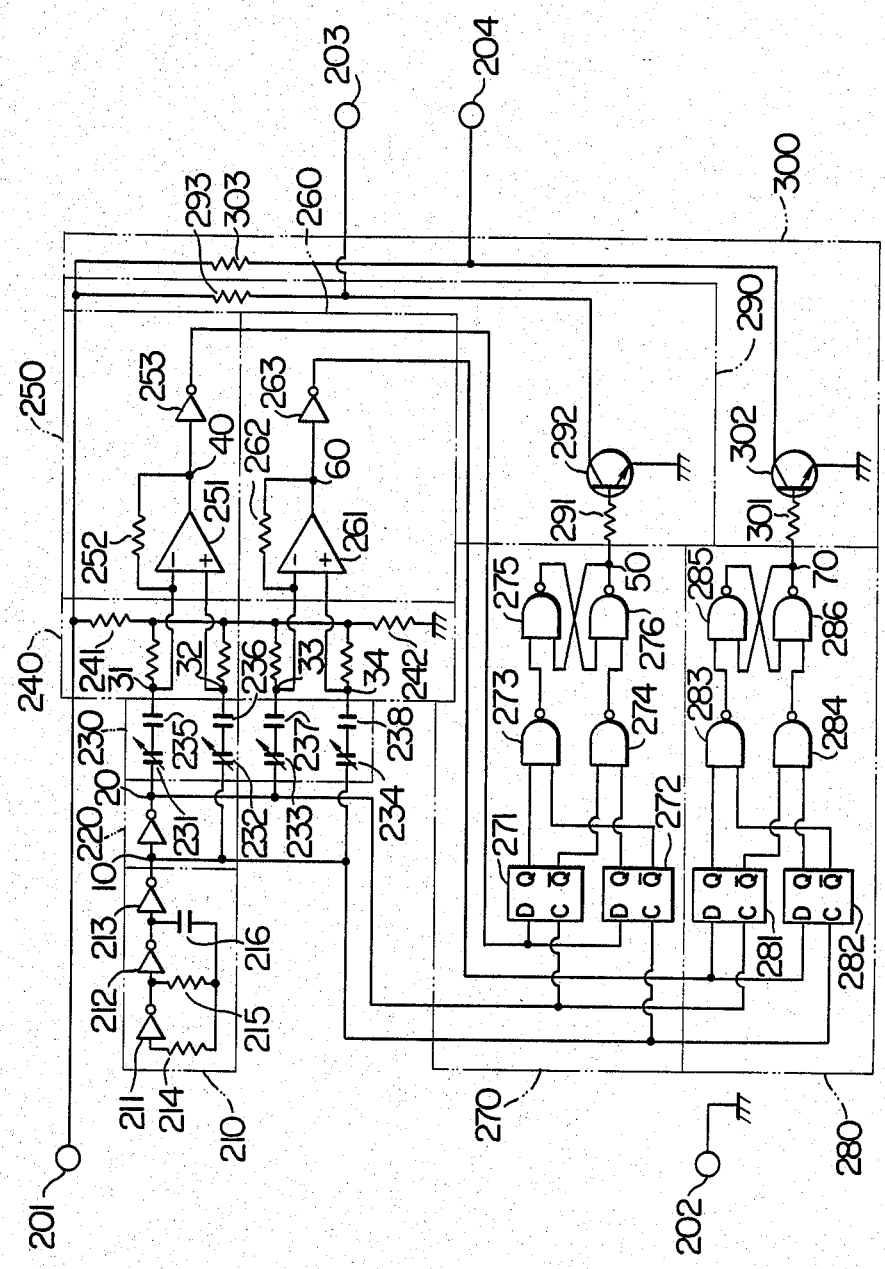
FIG. 3 is an electric circuit diagram showing a detecting circuit of the apparatus according to the present invention.

An electrical circuit diagram of the detecting circuit 130 is shown in FIG. 3. In FIG. 3, a power terminal 201 is impressed with a constant voltage Vc. Numeral 202 designates a grounding terminal. Numeral 210 designates a well-known CR oscillation circuit, and numeral 220 a reference signal generator circuit. The CR oscillation circuit 210 and the reference signal generator circuit 220 make up a periodical signal supply circuit. Numeral 230 designates a detector section including the electrodes 113, 114, 123, 124, 127, 128; and 131, 132, 133, 134, 141, 142, 143, 144. Numeral 240 designates a reference voltage circuit, numerals 250 and 260 first and second comparator circuits, numerals 270 and 280 first and second phase detector circuits, and numerals 290 and 300 distance coverage output circuits. Numerals 203 and 204 designate output terminals.

The operation of the apparatus having the abovementioned construction will be explained. In FIG. 3, the CR oscillator circuit 210 including inverter gates 211, 212 and 213, resistors 214 and 215 and a capacitor 216 produces an oscillation waveform 10 shown in FIG. 5(a). This oscillation waveform 10 is applied to a reference signal generator circuit 220 for producing a signal in phase with the oscillation waveform 10 and a signal 20 in opposite phase thereto as shown in FIG. 5(b). These signals 10 and 20 are applied respectively to the first and second input electrodes 113 and 114 of the first plate 110 as shown in FIG. 4. With the rotation of the second plate 120, the first, second, third and fourth subelectrodes or electrode units 123, 124, 127 and 128 of the second plate 120 come to oppose the first and second input electrodes 113 and 114 of the first plate 110 as shown in FIGS. 4A, 4B, 4C and 4D.

Figure 4A:
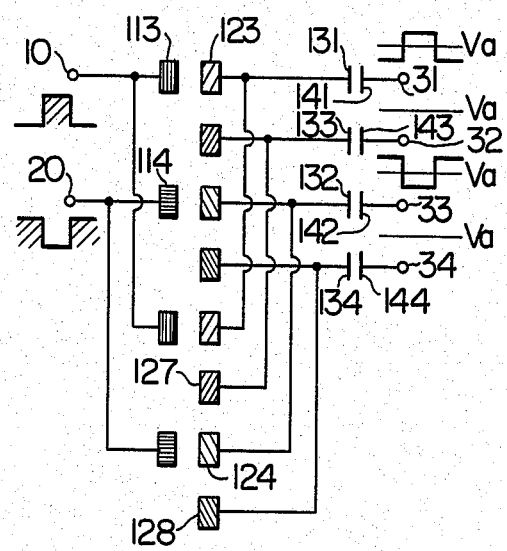
FIGS. 4A to 4D are electrical circuit diagrams showing relative positions of the electrodes with the movement of the electrodes for explaining the operation of the apparatus according to the present invention.

Now, explanation will be made of the case in which as shown in FIG. 4A, the rotation of the shaft 102 (FIG. 1) causes the rotation of the second plate 120 so that the third electrode unit 123 of the second plate 120 comes to oppose the first input electrode 113 of the first plate 110 and the fourth electrode unit 124 of the second plate 120 comes to oppose the second input electrode 114 of the first plate 110. A signal in phase with the oscillation waveform 10 is applied to the first electrode 113 of the first plate 110 from the connector 115 of the first plate 110, whereupon a capacitor (231 in FIG. 3) made up of the first input electrode 113 and the third electrode unit 123 of the second plate 120 causes a signal in phase with the waveform 10 to appear at the connecting line 123a shown in FIG. 2, which signal is transmitted as a signal 31-a of FIG. 5(c) to the first comparator circuit 250 through the connector 140a by a capacitor (235 in FIG. 3) made up of the first annular electrode 130 of the second plate 120 and the first annular electrode 140 of the first plate 110. In similar fashion, the signal 20 transmitted to the second electrode 112 of the first plate 110 via the connector 116 is produced in the form of a signal in phase with the signal 20 at the fourth electrode unit 124 of the second plate 120 by a capacitor (232 in FIG. 3) made up of the second input electrode 114 and the fourth input electrode unit 124 of the second plate 120, and by a capacitor (236 in FIG. 3) made up of the second annular electrode 131 of the second plate 120 and the second annular electrode 142 of the first plate 110, applied through the connector 142a to the first comparator 250 as a signal 33-a shown in FIG. 5(e). The signals 31-a and 33-a take waveforms based on the voltage Va shown in FIGS. 5(c), 5(d), 5(e) and 5(f) determined by the resistors 241 and 242 of the reference voltage circuit 240. The signals 31-a and 33-a are differentially amplified by a differential amplifier circuit including the operational amplifier 251 and the resistor 252 of the first comparator 250 so that the waveform of FIG. 5(g) delayed from the oscillation waveform 10 by time ΔT is produced as a signal 40-a where the time ΔT represents the response delay time of the capacitor and the switching delay time of the operational amplifier 251. The signal 50 is waveform-shaped by an inverter gate with the result that a waveform in opposite phase to the signal 40-a is applied to the data terminals of the D-type flip-flops 271 and 272 of the first phase detector circuit 270. The D-type flip-flops 271 and 272 are also supplied with the signal 10 and signal 20 in opposite phase to the oscillation waveform 10 from the CR oscillation circuit 210 respectively, so that a "1" signal is produced at the output terminal Q of the D-type flip-flop 271 and a "0" signal at the output terminal Q of the D-type flip-flop 272. A "0" signal is produced at the signal line 50 by the NAND gates 273, 274, 275 and 276. This signal is applied to the output circuit 290 and turns off the transistor 292 through the resistor 291, with the result that a first rotation signal of "1" state (signal 51 shown in FIG. 5(h)) indicating that the first electrode unit 123 of the second plate 120 is opposed to the first input electrode 113 of the first plate 110 or that the fourth electrode unit 124 of the second plate 120 is opposed to the second input electrode 114 of the first plate 110 is produced at the output terminal 203. Under this condition, in view of the fact that the third and fourth electrode units 127 and 128 of the second plate 120 are not opposed to the electrodes of the first plate, no waveform is produced at the third and fourth annular electrodes 142 and 143 of the first plate 110. As a result, as shown in 60-a of FIG. 5(i), no signal is produced at the signal line 60 (shown in FIG. 3) so that a "1" signal is produced at the signal line 70 in FIG. 3 while the second rotation signal of "0" state (signal 71 in FIG. 5) is produced at the output terminal 204.

Figure 4C:
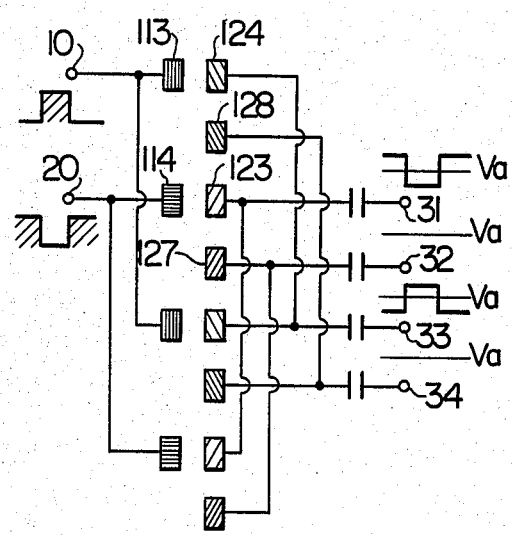
Figure 4B:
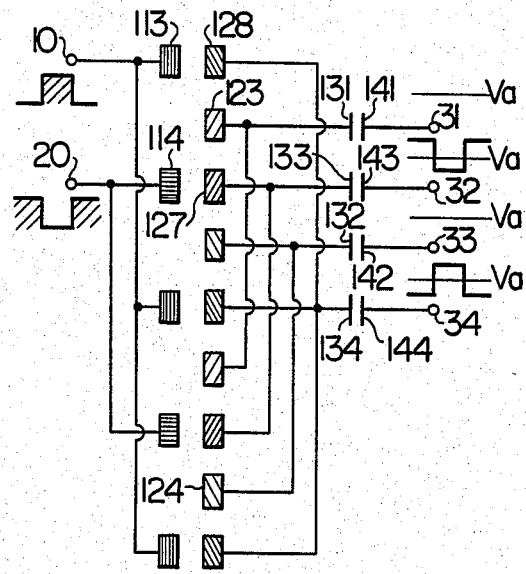

Now, assume that the shaft 105 (shown in FIG. 1) rotates to such a degree that as shown in FIG. 4(b), the fourth electrode unit 128 of the second plate 120 is opposed to the first input electrode 113 of the first plate 110 and the third electrode unit 127 of the second plate 120 is opposed to the second input electrode 114 of the first plate 110. A signal in phase with the signal 20 is produced at the third electrode unit 127 of the second plate 120 and the signal 32-a based on the voltage Va shown in FIG. 5(d) is produced at the third annular electrode 142 of the first plate 110. A signal in phase with the oscillation waveform 10 is produced at the fourth electrode unit 128 of the second plate 120 and the signal 34-a shown in FIG. 5(f) based on the voltage Va is produced at the fourth annular electrode 143 of the first plate 110. A signal as shown by 60-b in FIG. 5(i) is produced at the output terminal of the second comparator circuit 260, and a "0" signal is produced at the output terminal of the second phase detector circuit 280. The second rotation signal of "1" state (signal 72-b shown in FIG. 5(j)) indicating the fact that the third electrode unit 127 of the second plate 120 is in opposed relation to the second input electrode 114 of the first plate 110 is produced at the output terminal 204. Also assume that with a further rotation of the shaft 102 (shown in FIG. 1), the second electrode unit 124 of the second plate 120 comes to be opposed to the first input electrode 113 of the first plate 110 and the first electrode unit 123 of the second plate 120 comes to be opposed to the second input electrode 114 of the first plate 110 as shown in FIG. 4C. A signal in phase with the signal 10 is produced at the second electrode unit 124 of the second plate 120 and the signal 31-b shown in FIG. 5(c) based on the voltage Va is produced at the second annular electrode 141 of the first plate 110 as mentioned above. The signal 20 in opposite phase to the oscillation waveform 10 is produced at the first electrode unit 123 of the second plate 120, and the signal 33-a shown in FIG. 5(e) based on the voltage Va is produced at the first annular electrode 140 of the first plate 110. Then a signal as shown by 40-c of FIG. 5(g) is produced at the output terminal of the first comparator circuit 250. A "1" signal is produced at the output terminal of the first phase detector circut 280, while the first rotation signal of "0" state (signal 52 shown by FIG. 8(g)) indicating the fact that the first electrode unit 123 of the second plate 120 is in opposed relation to the second electrode unit 124 of the first plate 110 is produced at the output terminal 203.

Figure 4D:
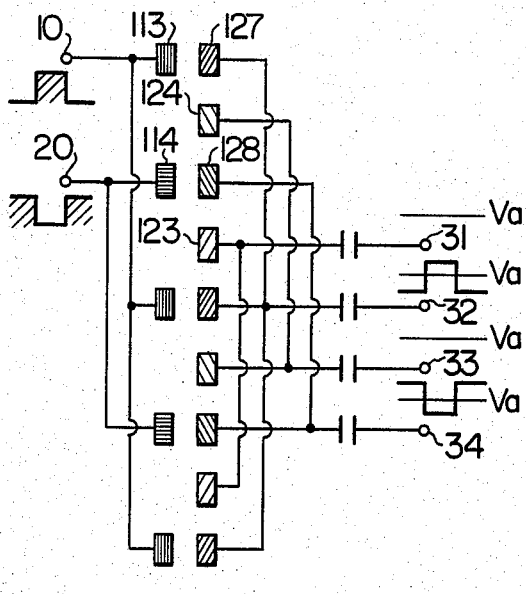
Figure 5:
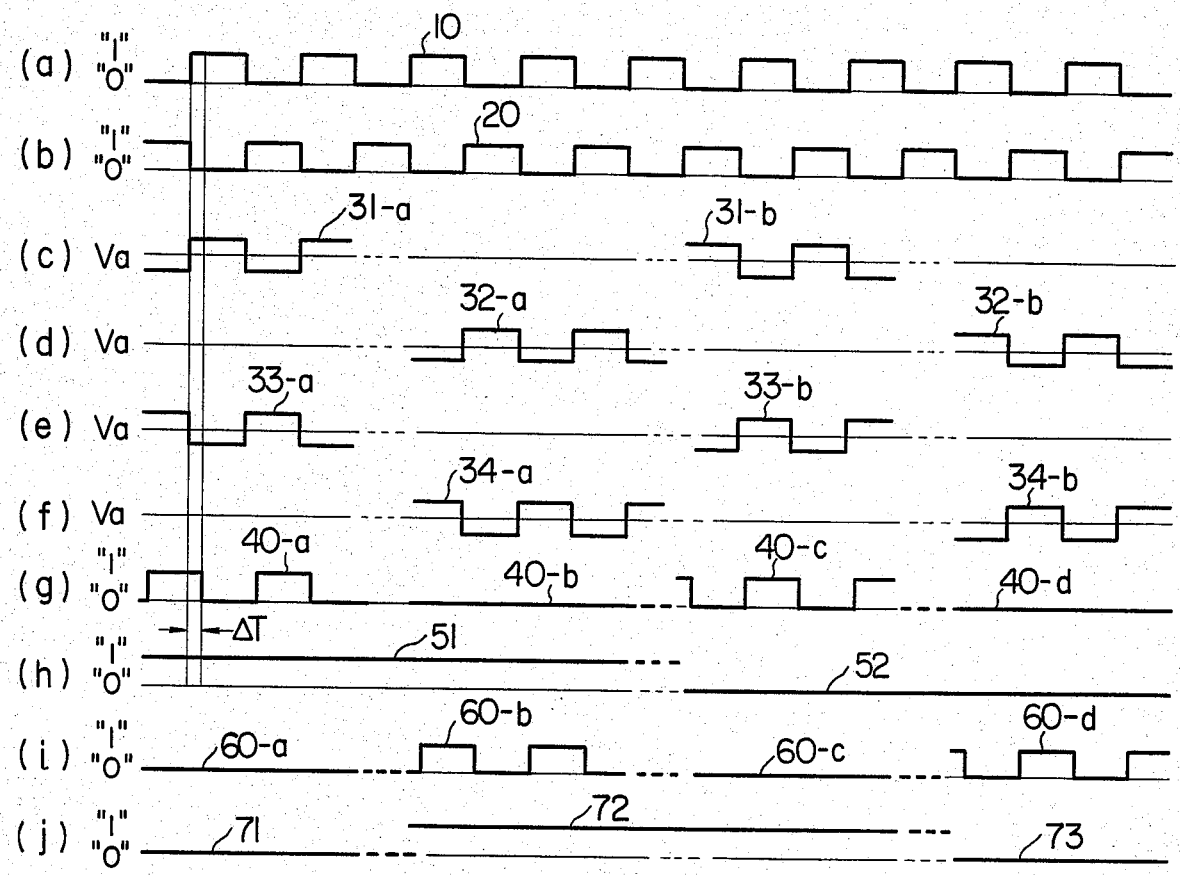
FIG. 5 shows waveforms produced at various parts for explaining the operation of the apparatus according to the present invention.
Figure 6:
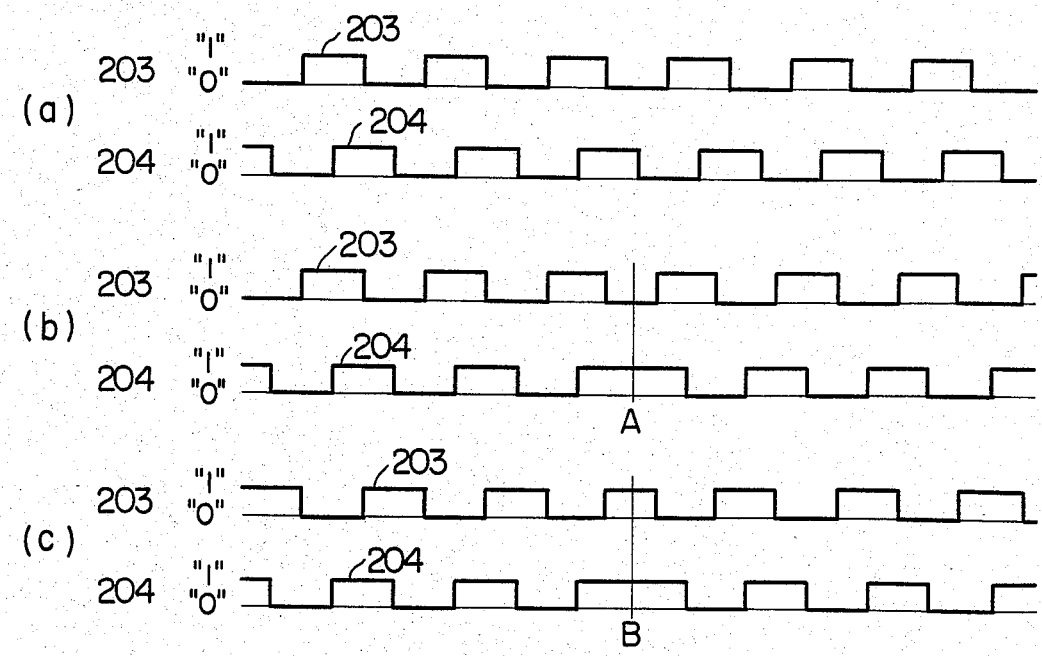
FIG. 6 shows signal waveforms representing the output waveforms of the apparatus according to the present invention.

Again assume that with a further rotation of the shaft 103 (signal 52 of FIG. 8(g)), the third electrode unit 127 of the second plate 120 is opposed to the first input electrode 113 of the first plate 110 and the fourth electrode unit 128 of the second plate 120 is opposed to the second input electrode 114 of the first plate 110 as shown in FIG. 4D. A signal in phase with the signal 10 is produced at the third electrode unit 127 of the second plate 120, and the signal 32-b of FIG. 5(d) based on the voltage Va is produced at the third annular electrode 142 of the first plate 110 as mentioned above. A signal in phase with the signal 20 is produced at the fourth electrode unit 128 of the second plate 120, and the signal 34-a of FIG. 5(f) based on the voltage Va is produced at the fourth annular electrode 144 of the first plate 110. Then a signal as shown by 60-d of FIG. 5(i) is produced at the output terminal of the second comparator circuit 260. A "1" signal is produced at the output terminal of the second phase detector circuit 280, while a second rotation signal of "0" state (signal 73 of FIG. 5(j)) indicative of the fact that the third electrode unit 127 of the second plate 120 is positioned in opposed relation to the first input electrode 113 of the first plate 110 is produced at the output terminal 204.

In this way, "1" and "0" signals are produced alternately at the output terminals 203 and 204 when, with the rotation of the shaft 103, the first electrode unit 123, the second electrode unit 124, the third electrode unit 127 and the fourth electrode unit 128 arranged on the second plate 120 pass over the first input electrode 113 and the second input electrode 114 arranged on the first plate 110. When the shaft 103 is rotating in a direction, signals in the overlapped state of "1" and "0" are produced alternately at the terminals 203 and 204 as shown in FIG. 6(a). In the case where the shaft 103 changes the direction of rotation at point A (shown in FIG. 6(b)), a signal as shown in FIG. 6(b) is produced at the terminals 203 and 204. Further, when the shaft 103 changes the direction of rotation at point B (shown in FIG. 6(c)), a signal waveform as shown in FIG. 6(c) is produced at terminals 203 and 204.

Now, explanation will be made of the case in which the rotational angle of the shaft is digitally indicated by the signals as mentioned above.

Figure 7:
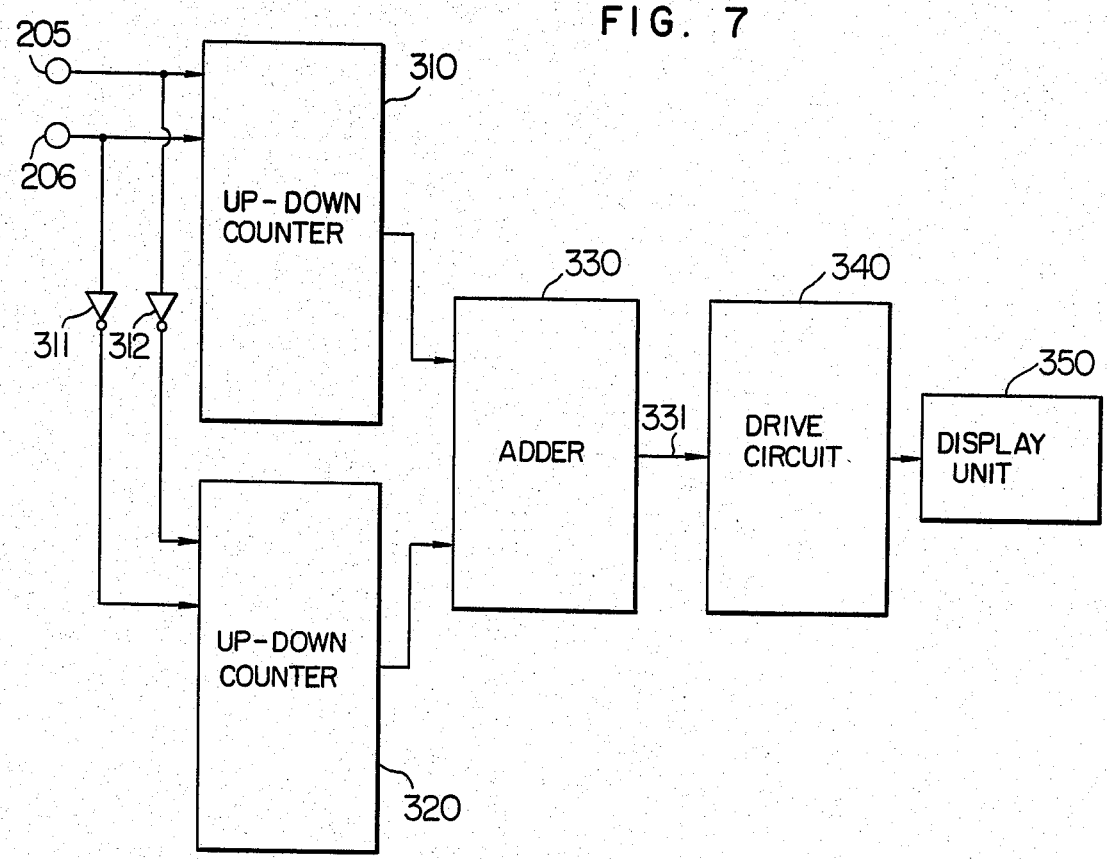
FIG. 7 is a block diagram for digitally displaying the distance covered by the shaft in response to an output signal of the apparatus according to the present invention.

A block diagram of an embodiment of digital display is shown in FIG. 7. In FIG. 7, terminals 205 and 206 are connected respectively to the output terminals 203 and 204 in FIG. 3. The terminal 205 is connected to the clock terminal of the up-down counter 310, while the terminal 206 is connected to the up-down terminal of the up-down counter 310. The terminals 205 and 206 are connected through the inverter gates 311 and 312 to the clock terminal and the up-down terminal of the up-down counter 320 respectively. Numeral 330 designates an adder, and numeral 340 a drive circuit for the display unit 350. In this configuration, explanation will be made of the case where the signal of FIG. 6(a) is applied to the terminals 205 and 206.

The second rotation signal 204 applied to the up-down terminal of the up-down counter 310 is always "0" at the rise of the first rotation signal 203 applied to the clock terminal of the up-down coutner 310, so that the up-down counter 310 counts up at the rise point of the signal 203. A signal in opposed phase to the first rotation signal 203 is applied to the clock terminal of the up-down coutner 320, while a signal in opposite phase to the second rotation signal 204 is applied to the up-down terminal. Therefore, the signal at the up-down terminal is in "0" state at the fall of the signal 203, and the up-down counter 320 counts up at the fall of the first rotation signal 203. The output signals of the up-down counters 310 and 320 are applied to the adder 330, with the result that a signal representing an increment, one each, at the rise and fall of the first rotation signal 203 is produced at the signal line 331. By display of this signal, the angle that the shaft has rotated is capable of being displayed digitally.

Now, assume that the signal shown in FIG. 6(b) is received. At point A where the direction of rotation of the shaft has changed, the up-down terminal of the up-down counter 310 changes from "0" to "1" at the rise of the first rotation signal 203, and the up-down terminal of the up-down counter 320 changes from "0" to "1" at the fall of the first rotation signal 203 for count down. As a result, at point A, the display unit 350 displays a digital value representing a decrement, one each, at the rise and fall of the signal 203.

In similar fashion, assume that a signal shown in FIG. 6(c) is received. At point B where the direction of shaft rotation has changed, the up-down terminal of the up-down counters 310 and 320 changes from "1" to "0" state at the rise and fall points of the first rotation signal 203, so that a signal representing an increment, one each, at the rise and fall of the signal is produced again on signal line 331.

As explained above, the first and second rotation signals may be produced by the capacitance change depending on whether the first and second input electrodes of the first plate are in opposed relation to the first and second electrode units of the third output electrode of the second plate or to the third and fourth electrode unit of the fourth output electrode of the second plate. By logical computation of these first and second rotation signals, the rotational angle may be easily displayed.

In the embodiment under consideration, signals produced at the first, second, and third, fourth electrode units of the second plate 120 are compared with each other at a comparator circuit. As an alternative, the first and third electrode units may be done without. In that case, the first and third annular electrodes arranged in opposition on the first and second plates are not necessary, thus simplifying the electrode construction. An electrode construction and a comparator circuit of such an embodiment are shown in FIG. 8.

Figure 8:
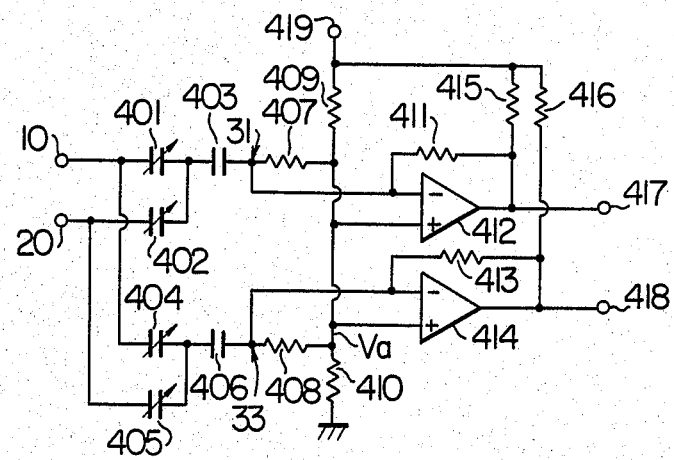
FIG. 8 is an electrical circuit diagram showing a second embodiment of the apparatus according to the present invention.

In FIG. 8, numerals 401, 402 and 403 designate capacitors formed by the first and second electrodes 113, 114, and the second annular electrode 141 of the first plate 110, and the second electrode unit 124 and the second annular electrode 131 of the second plate 120. Numerals 404, 405 and 406 designate capacitors formed by the first and second electrodes 113 and 114 and the fourth annular electrode 143 of the first plate 110, and the fourth electrode unit 128 and the fourth annular electrode 133 of the second plate 120. The signal produced at the terminal 32 is compared with the voltage valve Va determined by the resistors 409 and 410 respectively and applied to a phase detector circuit. Numeral 419 designates a power terminal.

I claim:

1. A rotation detecting apparatus comprising:
    a fixed first circular plate having a plurality of first and second input electrodes alternately arranged at equal spatial invervals along the circumference of said first plate;
    a rotatable second circular plate facing said first plate so that a plurality of third output electrodes arranged at equal spatial intervals along the circumference of said second plate are in opposed relation with said first and second input electrodes of said first plate at one rotational position of said second plate, and so that a plurality of fourth output electrodes arranged at equal spatial intervals along the circumference of said second plate are adapted to be in opposed relation with said first and second input electrodes when said second plate is rotated such that said third output electrodes are not in opposed relation which said first and second input electrodes of said first plate;
    periodic signal supply circuit means for supplying signals of a predetermined period and opposite alternating phase to said first and second input electrodes, respectively, of said first plate, said signals inducing signals in said third and fourth electrodes when they are positioned opposite said first and second electrodes;
    induced signal transmission means for transmitting said signals induced in said third and fourth electrodes from said second plate to said first plate;
    first and second rotation signal generator circuit means for detecting the phases of said signals induced in said third and fourth output electrodes and comparing said detected phases with the phase of said signals supplied by said periodic signal supply circuit means to thereby produce first and second rotation signals; and
    rotation output circuit means for producing, in response to said first and second rotation signals, a signal indicating the direction of rotation of said second plate and for indicating the angle of said rotation.

2. A rotation detecting apparatus according to claim 1, wherein said third electrode of said second plate includes alternately arranged first and second electrode units,
    said fourth electrode of said second plate includes alternately arranged third and fourth electrode units, and
    said first and second rotation signal generator circuit means includes respectively first and second comparator circuit means for comparing signals induced in said first and second electrode units and signals induced in said third and fourth electrode units respectively to thereby produce output signals, and includes respectively first and second phase detector circuit means for detecting the phases of said output signals of said first and second comparator circuits and said signals supplied by said periodic signal supply circuit means and for generating said first and second rotation signals when said output signals of said comparator circuits are reversed.

3. A rotation detecting apparatus according to claim 1, wherein each of said third and fourth output electrodes of said second plate includes a single electrode unit arranged along the circumference of said second plate, and said rotation signal generator circuit means includes first and second comparators and first and second phase detector circuits, said first and second comparators comparing the signals produced at said first and second input electrodes with a signal of a predetermined level respectively to thereby produce outputs, said first and second phase detector circuits detecting the phases of said output signals of said comparator and said signals supplied by said periodic signal supply circuit means and generating first and second rotation signals respectively when the phases of said output signals of said first and second comparator circuits are reversed.

4. A rotation detecting apparatus according to any one of claims 1, 2, or 3, wherein said rotation output circuit means further includes means for selecting one of addition and subtraction of selected one of said rotation signals to and from, respecitvely, and addition-subtraction command signal, the non-selected one of said first and second rotation signals constituting said addition-subtraction command signal, thereby producing signals corresponding to the direction of rotation and the angle of rotation.

5. A rotation detecting apparatus according to claim 1 wherein said induced signal transmission means includes a plurality of annular signal transmitting electrodes arranged in opposed relation to each other on said first and second plates, said induced signal transmission means constituting capacitors for effecting capacitive-coupling of signals in a contactless manner.

6. A rotation detecting apparatus comprising:
    a first circular plate including a plurality of first and second input electrodes alternately arranged at equal spatial intervals along the circumference of said first plate;
    a second circular plate facing said first circular plate and including a plurality of third output electrodes arranged at equal spatial intervals along the circumference of said second circular plate in opposed relation to said first and second input electrodes of said first circular plate, and a plurality of fourth output electrodes arranged at equal spatial intervals along the circumference of said second circular plate which are adapted to be opposed to said first and second input electrodes when said second plate is rotated so that said third output electrodes are not in opposed relation to said first and second input electrodes of said first circular plate;
    a periodic signal supply circuit for supplying signals of a predetermined period and alternately opposite phases to first and second input electrodes of said first circular plate;
    first and second rotation signal generator circuits for detecting the phase conditions of the signals produced at said third and fourth output electrodes of said second circular plate and the signal produced from said periodic signal supply circuit thereby to produce first and second rotation signals the phase of which are different from each other;
    a rotation output circuit for producing a signal indicating the direction and angle of rotation of said second plate, in response to said first and second rotation signals; and signal transmitter means for transmitting signals produced at said third and fourth output electrodes of said second circular plate to said first circular plate, wherein said rotation output circuit comprises a first up-down counter having a clock terminal to which one of said first and second rotation signals is supplied and up-down terminal to which the other of said first and second rotation signals is supplied, a pair of inverters for respectively inverting said first and second rotation signals, a second up-down counter having a clock terminal to which one of said inverted rotation signals is supplied and an up-down terminal to which the other said inverted rotation signal is supplied; and an adder, connected to the outputs of both said first and second up-down counters, for adding said outputs so as to produce said rotation output circuit signal.

7. A rotation detecting apparatus according to claim 6, wherein said third electrode of said second plate includes alternately arranged first and second electrode units, said fourth electrode of said second plate includes alternately arranged third and fourth electrode units, and said rotation signal generator circuits includes first and second comparator circuits and first and second phase detector circuits respectively, said first and second comparator circuits comparing the signals produced from said first and second electrode units and the signals produced from said third and fourth electrodes units respectively thereby to product output signals, said first and second phase detector circuits detecting the phases of the output signals of said first and second comparator circuits and the signal produced from said periodic signal supply circuit and generating first and second rotation signals when the output signals of said comparator circuits are reversed.

8. A rotation detecting apparatus according to claim 6, wherein each of said third and fourth output electrodes of said second plate includes a single electrode unit arranged along the circumference of said second plate, and said rotation signal generator circuit includes first and second comparators and first and second phase detector circuits, said first and second comparator circuits comparing the signals produced at said first and second input electrodes with a signal of a predetermined level respectively thereby to produce outputs, said first and second phase detector circuits detecting the phases of the output signals of said comparator circuits and the signal produced from said periodic signal circuit and generating first and second rotation signals respectively when the phases of the output signals of said first and second comparator circuits are reversed.

9. A rotation detecting apparatus according to claim 6 wherein said signal transmitter means includes a plurality of annular signal transmitting electrodes arrangd in opposed relation to each other on said first and second plates, said signal transmitter means comprising capacitors for coupling signals in a contactless manner.

* * * * *